United States Patent [19]
Klag et al.

[11] 3,919,334
[45] Nov. 11, 1975

[54] PROCESS FOR PREPARING PYROCATECHOL

[75] Inventors: Günther Klag, Leverkusen; Hermann Wunderlich, Odenthal; Gerhard Jung, Opladen; Rolf Aumüller, Leverkusen, all of Germany

[73] Assignee: Bayer Aktiengesellschaft, Leverkusen, Germany

[22] Filed: July 24, 1973

[21] Appl. No.: 382,233

[30] Foreign Application Priority Data
Aug. 1, 1972   Germany............................ 2237750

[52] U.S. Cl. .............................................. 260/629
[51] Int. Cl.² .................. C07C 37/02; C07C 39/08
[58] Field of Search ........................... 260/629, 625

[56] References Cited
UNITED STATES PATENTS

| | | | |
|---|---|---|---|
| 2,041,592 | 5/1936 | Burroughs | 260/629 |
| 3,536,767 | 10/1970 | Sommerfield | 260/629 |

FOREIGN PATENTS OR APPLICATIONS

| | | | |
|---|---|---|---|
| 1,961,445 | 6/1971 | Germany | 260/629 |
| 2,042,639 | 3/1972 | Germany | 260/629 |

*Primary Examiner*—Bernard Helfin
*Assistant Examiner*—W. B. Lone
*Attorney, Agent, or Firm*—Burgess, Dinklage & Sprung

[57] ABSTRACT

Pyrocatechol is prepared by hydrolyzing o-chlorophenol with less than 3 mols of aqueous alkali liquor per mol of o-chlorophenol, under pressure, in the presence of metallic copper as catalyst and at a temperature of from 180° to 250°C.

8 Claims, No Drawings

PROCESS FOR PREPARING PYROCATECHOL

BACKGROUND

This invention relates to a process for the production of pyrocatechol by the hydrolysis of o-chlorophenol.

It is known that the hydrolysis of monochlorophenols with sodium hydroxide results in the formation of a number of poly-hydroxyaryl compounds which can be described by the formula (1):

$$HO(C_6H_4O)_nH \qquad (1)$$

compounds in which $n=1$ being formed to a greater extent, the greater the molar ratio of sodium hydroxide to chlorophenol and the higher the reaction temperature. In other words, dihydroxybenzenes are predominantly formed under these conditions, the position of the second hydroxyl group being governed by, but not necessarily being the same as, the original position of the chlorine atom. For example, resorcinol may be formed in addition to pyrocatechol from o-chlorophenol. Accordingly, it has never appeared possible to carry out this reaction on a commercial scale substantially free from the formation of resorcinol (Int. Eng. Chem. Prod. Res. Develop., C 76–78 (1971). Although it has long been known that copper or copper salts can be used to catalyse this reaction (German Pat. No. 269,544), several recent proposals (cf. DOS No. 2,042,639) have shown that there is still a need for a simple efficient process which provides good yields of pyrocatechol without appreciable quantities of resorcinol or other secondary products being formed.

SUMMARY

According to the invention, there is provided a process for the production of pyrocatechol, in which o-chlorophenol is hydrolysed by less than 3 mols of aqueous alkali liquor per mol of O-chlorophenol, the reaction being carried out under pressure, in the presence of metallic copper as catalyst and at a temperature of from 180° to 250°C.

DESCRIPTION

The reaction is preferably carried out at a temperature of from 190° to 240°C and, more particularly, at a temperature of from 200° to 210°C. The pressure is generally from 15 to 45 atms, preferably from 20 to 35 atms. and, more particularly, from 22 to 25 atms.

In general, from 2.0 to 2.9 mols and preferably from 2.1 to 2.5 mols of alkali hydroxide are used per mol of o-chlorophenol for carrying out the process according to the invention. Although aqueous solutions of any alkali metals can be used for carrying out the process, it is preferred to use sodium or potassium hydroxide, more particularly a mixture of both. The alkali hydroxide solution is generally used in a concentration of from about 5 to 30 % by weight of alkali hydroxide, 10 to 20 % by weight aqueous solutions, more particularly 12 to 15 % by weight solutions, being preferred. The copper catalysts are used in the form of metallic copper, either as powder or filings. In general, it has proved to be advantageous to fill the reaction vessel or vessels with copper powder, copper wool or copper filings.

It must be regarded as extremely surprising that an almost quantitative conversion is obtained in the process according to the invention, with excellent yields of pyrocatechol when less than the stoichiometrically necessary quantity of 3 mols of alkali hydroxide per mol of o-chlorophenol is used, because at least the stoichiometrically necessary quantity of alkali hydroxide has hitherto been required to obtain a corresponding conversion and coresponding yields (DOS No. 1,961,445), in addition to which the use of at least 4 mols, but preferably from 5 to 7 mols, of alkali hydroxide has also been regarded as necessary (DOS No. 2,042,639). In addition, the process of the invention does not require any special materials, such as silver for example, for the reactors.

In general, the process according to the invention is carried out by introducing the starting compound, o-cholorphenol, and aqueous alkali, preferably a mixture of potassium hydroxide and sodium hydroxide, and the copper catalyst into an autoclave (for example a copper autoclave) and heating the mixture to the reaction temperature until the o-chlorophenol has completely reacted. Complete reaction of the o-chlorophenol can readily be determined by titrating a sample.

Instead of using a mixture of sodium hydroxide and potassium hydroxide, it is also possible to use sodium hydroxide alone and, even in this case, to obtain much shorter reaction times compared with the prior art, amounting to between about 1 hour and at most 2 hours. In this case, the reaction is preferably carried out in the upper temperature range. However, it is particularly preferred to use a mixture of aqueous sodium hydroxide and potassium hydroxide, the molar ratio of sodium hydroxide to potassium hydroxide amounting to from 7 : 1 to 1 : 1, preferably to 5 : 1 to 3 : 1 and, more particularly, to 4 mols of sodium hydroxide to 1 mol of potassium hydroxide. In cases where mixtures of this kind are used, the reaction time in the temperature ranges specified above is generally less than 1 hour and, in most cases, of from about 15 to 30 minutes.

It is of particular advantage to carry out the process continuously, using one or more copper reaction tubes, arranged one behind the other, which are filled, for example, with copper fillings and into which the reaction mixture is pumped, optionally after having been admixed in a mixing chamber, in such a way that an average residence time of from about 15 to about 30 minutes is guaranteed. Average residence times of about 20 minutes are preferred. After leaving the reactor, the reaction mixture is worked up either continuously or in batches. Instead of using copper reaction tubes, it is also possible to use lined pressure vessels filled with copper filings, for example.

To work up the reaction mixture, it has proved to be advantageous to dissipate the heat inherent in the reaction solution in such a way that it can be used for heating fresh starting material (countercurrent principle). The batches are worked up in the usual way, for which purpose the reaction mixture is best combined with the quantity of aqueous sulphuric acid (preferably about 50% by weight) or about 30 % by weight aqueous hydrochloric acid required for acidification (to about pH 3), the pyrocatechol is extracted from the resulting acidic solution with an inert organic solvent immiscible with water (preferably ethyl acetate, n-, sec.- or tert.-butanol) and is subsequently isolated. It is, of course, also possible to introduce the aqueous alkali liquor initially into the autoclave and to feed in the o-chlorophenol after heating to the reaction temperature.

It must be regarded as extremely surprising that almost quantitative conversions and, in addition, high yields of pyrocatechol can be obtained in the process according to the invention using less than the stoichiometrically necessary quantity of alkali hydroxide, at relatively low temperatures and with shorter reaction times (only 15 to 30 minutes as opposed to the usual 4 hours at 200° to 210°C).

The pyrocatechol obtainable by the process according to the invention is a valuable intermediate product for the production of plant-protection agents.

The process according to the invention is illustrated in the following Examples, in which all percentages are by weight.

EXAMPLE 1

A solution of 36 g (0.9 mol) of sodium hydroxide, 14 g (0.25 mol) of potassium hydroxide and 64 g (0.5 mol) of o-chlorophenol in 330 g of water is heated for 15 to 20 minutes to a temperature of 205°C in a 0.7 liter copper autoclave, following the addition of 1.25 g of copper powder. After cooling, acidification with 50 % by weight aqueous H2SO4 (to about pH3), extraction with ethyl acetate and distillation of the organic extract, 46 g (83.6 % of the theoretical) of pyrocatechol, 2.6 g (5.5 % of the theoretical) of phenol and 2.1 g (4.2 % of the theoretical) of o-chlorophenol are obtained. For a conversion of 95.8 % of the o-chlorophenol used, this corresponds to a yield of 87.2 % of the theoretical.

EXAMPLE 2

36 g (0.9 mol) of sodium hydroxide, 14 g (0.25 mol) of potassium hydroxide, 330 g of water and 0.5 g of copper powder are heated to 190°C in a 0.7 liter copper autoclave and 64 g (0.5 mol) of o-chlorophenol are pumped in at this temperature over a period of 1 to 2 minutes. The temperature rises to between 200° and 210°C before the addition is completed. After 20 to 25 minutes, the reaction mixture is cooled and worked up as described in Example 1. 45.5 g (82.7 % of the theoretical) of pyrocatechol, 2.4 g (5.1 % of the theoretical) of phenol, 2.2 g (4.4 % of the theoretical) of 2,2'-dihydroxy-diphenyl-ether and 1.7 g (2.7 % of the theoretical) of o-chlorophenol are isolated. The yield of pyrocatechol amounts to 85 % of the theoretical, based on the 97.3 % conversion of o-chlorophenol. The same result is obtained when butanols are used for extraction instead of acetic esters.

EXAMPLE 3

32 g (0.8 mol) of sodium hydroxide, 11 g (0.2 mol) of potassium hydroxide, 300 g of water and 0.5 g of copper powder are heated to 190°C in a 0.7 liter copper autoclave. 64 g (0.5 mol) of o-chlorophenol are then pumped in at this temperature over a period of 1 to 2 minutes. The temperature rises to between 200°and 210°C without further heat being supplied. After 20 to 25 minutes, the reaction mixture is cooled to room temperature and worked up in the same way as described in Example 1. The following yields are obtained: 42 g (70.4 % of the theoretical) of pyrocatechol, 6.6 g (14.1 % of the theoretical) of phenol, 2.1 g (4.2 % of the theoretical) of 2,2'-dihydroxydiphenylether and 1.2 g (1.9 % of the theoretical) of o-chlorophenol. For an approximately 98 % conversion, the yield of pyrocatechol amounts to about 78.5 % of the theoretical.

EXAMPLE 4

If in Example 1 the 0.25 mol of potassium hydroxide is replaced by 0.2 mol of sodium hydroxide, a 95 % reaction of the o-chlorophenol used is obtained after a reaction time of 60 minutes at 250°C. Working up in the usual way gives 40 g of pyrocatechol (72.7 % of the theoretical), 3.5 g of phenol (7.2 % of the theoretical) and 3.2 g (5 %, based on input) on unreacted o-chlorophenol. The yield of pyrocatechol amounts to 76.5% of the theoretical, based on the conversion.

EXAMPLE 5 o-chlorophenol and a mixture of 13 % by weight of aqueous sodium hydroxide and potassium hydroxide in a molar ratio of o-chlorophenol : sodium hydroxide : potassium hydroxide of 1 : 1.8 : 0.5 is passed through a reaction system, consisting of heat exchangers, preheaters, a mixing chamber and a reaction tube filled with copper filings, under a pressure of from 25 to 30 bars and at a temperature of from 200° to 220°C, so that an average residence time of 20 minutes is guaranteed. All those parts of the apparatus in contact with hot reaction solution are made of copper.

A red solution containing pyrocatechol, phenol, o-chlorophenol, 2,2'-dihydroxydiphenylether and small quantities of higher molecular weight compounds, is obtained behind the relief valve. 90.3 g (82.1 % of the theoretical) of pyrocatechol, 6.8 g (7.2 % of the theoretical) of phenol, 4.6 g (4.6 % of the theoretical) of 2,2'-dihydroxydiphenylether and 3.9 g (3.0 % of the theoretical) of are obtained from 128.5 used. g (1 mol) of the o-chlorophenol used. This corresponds to a pyrocatechol yield of about 85 % of the theoretical for a 97 % conversion.

EXAMPLE 6

The procedure is as in Example 5, except that the molar ratio of o-chlorophenol : sodium hydroxide : potassium hydroxide is 1 : 2.0 : 0.5. With an average residence time of 30 to 35 minutes, 83.4 mols of pyrocatechol, 6.1 mols of phenol, 2.0 mols of 2,2'-dihydroxydiphenylether and 1.7 mol of o-chlorophenol are obtained per 100 mol of o-chlorophenol used, corresponding to an approximately 85 % yield of pyrocatechol, based on the 98.3 % conversion.

EXAMPLE 7

The procedure is as in Example 5, except that the potassium hydroxide is replaced by an equimolar quantity of 13 % by weight sodium hydroxide. With a residence time of 60 minutes at a temperature of 250°C, 74 mols of pyrocatechol and 6 mols of unreacted o-chlorophenol are obtained per 100 mol of o-chlorophenol used, corresponding to a pyrocatechol yield of 78.7 % of the theoretical, based on the 94 % conversion of the o-chlorophenol.

EXAMPLE 8

The procedure is as in Example 5, except that the reaction is carried out over a period of 15 minutes at a temperature of 250°C and under a pressure of 35 bars. 76 mols of pyrocatechol, 5 mols of phenol, 1.5 mol of 2,2'-dihydroxydiphenylether and 7 mols of unreacted o-chlorophenol are obtained per 100 mol of o-chlorophenol used. The pyrocatechol yield amounts to 81.5 % of the theoretical, based on the conversion.

EXAMPLE 9

The procedure is as in Example 5, except that the reaction is carreid out over a period of 50 minutes at a temperature of 180°C and under a pressure of 20 bars. 60 mols of pyrocatechol 3 mols of phenol, 1.2 mols of 2,2'-dihydroxy-diphenylether and 26 mols of unreacted o-chlorophenol are obtained per 100 mols of o-chlorophenol used. The pyrocatechol yield amounts to 81 % of the theoretical, based on the conversion.

What is claimed is:

1. Process for preparing pyrocatechol which consists essentially of hydrolyzing o-cholorphenol with 2.0 to 2.9 mols of aqueous alkali liquor per mol of o-chlorophenol, under pressure of 15 to 45 atm, in the presence of metallic copper as catalyst and at a temperature of from 180° to 250°C.

2. Process of claim 1 wherein from 2.1 to 2.5 mols of alkali hydroxide are used per mol of o-chlorophenol.

3. Process of claim 1 wherein a 5 to 30% by weight aqueous solution of alkali hydroxide is used.

4. Process of claim 1 wherein the alkali is a mixture of sodium hydroxide and potassium hydroxide in a molar ratio of from 7 : 1 to 1 : 1.

5. Process of claim 4 wherein the molar ratio of sodium hydroxide to potassium hydroxide is 4 : 1.

6. Process of claim 1 carried out at a temperature of from 200° to 210°C.

7. Process of claim 1 carried out under a pressure of from 20 to 35 atms.

8. Process for preparing pyrocatechol which consists essentially of hydrolyzing o-chlorophenol with 2.0 to 2.9 mols of aqueous alkali liquor per mol of o-chlorophenol, under pressure of 15 to 45 atm, in the presence of metallic copper as catalyst and at a temperature of from 180° to 250°C, said aqueous alkali being a 5 to 30 percent by weight aqueous solution of a mixture of sodium hydroxide and potassium hydroxide in a molar ratio of from 7 : 1 to 1 : 1.

* * * * *